(12) United States Patent
Luo et al.

(10) Patent No.: US 8,917,074 B2
(45) Date of Patent: Dec. 23, 2014

(54) SYSTEMS AND METHODS FOR ADAPTIVE BODY BRAKING CONTROL IN A VOLTAGE REGULATOR

(75) Inventors: Shiguo Luo, Austin, TX (US); John Breen, Harker Heights, TX (US); Kejiu Zhang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 578 days.

(21) Appl. No.: 13/281,639

(22) Filed: Oct. 26, 2011

(65) Prior Publication Data
US 2013/0106373 A1    May 2, 2013

(51) Int. Cl.
H02M 3/156 (2006.01)
H02M 3/158 (2006.01)
H02M 3/157 (2006.01)

(52) U.S. Cl.
CPC .......... *H02M 3/1588* (2013.01); *Y02B 70/1466* (2013.01); *H02M 2003/1566* (2013.01)
USPC .......................................... 323/284; 713/300

(58) Field of Classification Search
USPC .......... 323/282, 283, 284, 285; 713/300, 310, 713/320, 323
See application file for complete search history.

(56) References Cited

U.S. PATENT DOCUMENTS

| | | | |
|---|---|---|---|
| 6,753,723 B2 | 6/2004 | Zhang | |
| 6,804,091 B2 | 10/2004 | Jenkins et al. | |
| 7,436,162 B2 | 10/2008 | Walters | |
| 7,441,129 B2 * | 10/2008 | Lougee | 713/300 |
| 7,816,896 B2 * | 10/2010 | Lipcsei et al. | 323/271 |
| 2009/0167271 A1 | 7/2009 | Tang et al. | |

\* cited by examiner

*Primary Examiner* — Gary L Laxton
(74) *Attorney, Agent, or Firm* — Baker Botts L.L.P.

(57) ABSTRACT

A voltage regulator that includes a high-side and a low-side power transistor is implemented where the high-side and the low-side power transistors are operable to output power to a transient load. The voltage regulator further includes control circuitry coupled to the high-side low-side power transistors and the transient load, with the control circuitry operable to receive a control signal from the transient load or the system. The control signal may correspond to an operating voltage of the transient load. In response to a decrease in a power level, the control circuitry may turn off the high-side power transistor, turn on the low-side power transistor a first duration, and turn off the low-side power transistor for a second duration. The first duration and the second duration may be based, at least in part, on the operating voltage.

11 Claims, 6 Drawing Sheets

SYSTEMS AND METHODS FOR ADAPTIVE BODY BRAKING CONTROL IN A VOLTAGE REGULATOR

TECHNICAL FIELD

The present disclosure relates generally to the operation of computer systems and information handling systems, and, more particularly, to systems and methods for adaptive body braking control in a voltage regulator.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include multiple transient loads, such as processors and memory, whose power requirements change during operation. A voltage regulator ("VR") coupled to the transient loads may provide the power to the transient loads, increasing or decreasing the power output in response to load requirements. A system processor, for example, may operate at a particular voltage, but the power required by the system processor may fluctuate depending on the processing operations to be completed at a given time. When a power increase is required, the VR must increase the output current so that the system processor receives the additional power it requires, but the output voltage must remain substantially constant. Likewise, when a power decrease is required, the VR must decrease the output current so that the system processor receives less power, but the output voltage must still remain substantially constant.

In practice, there is a lag time between when the power required by the system processor drops and when the VR can decrease the output current accordingly. The excess current generated by the VR and unneeded by the system processor creates an overshoot voltage at the output of the VR. If the overshoot voltage is large enough, it can damage sensitive components in the transient load. Existing methods for dealing with the overshoot voltage include increasing the output capacitance of the VR to suppress the overshoot voltage, or "body braking" by using the body diode of a power metal-oxide-semiconductor-field-effect transistor ("MOSFET") in the VR to dissipate the excess current. Both options are problematic, however, as large capacitors increase the cost and size of the VR and "body braking" generates additional power loss and excess heat.

SUMMARY

The present application is directed to a voltage regulator including a high-side power transistor and a low-side power transistor coupled to the high-side power transistor. The high-side power transistor and low-side power transistor are operable to output power to a transient load. The voltage regulator further includes control circuitry coupled to the high-side power transistor, the low-side power transistor, and the transient load, with the control circuitry operable to receive a control signal from the transient load. The control signal may correspond to an operating voltage of the transient load. In response to a decrease in a power level required by the transient load, the control circuitry may turn off the high-side power transistor, turn on the low-side power transistor for at least one first duration, and turn off the low-side power transistor for at least one second duration. The at least one first duration and the at least one second duration may be based, at least in part, on the control signal.

The system and method disclosed herein is technically advantageous because it allows adaptive dissipation of overshoot voltage in a voltage regulator. In particular, the system and method disclosed herein includes adaptive switching intervals and threshold body braking control schemes that allow for the optimization of VR designs. For example, the VR can be optimized to achieve the optimum tradeoff between thermal generation and capacitor size, and between the lowest cost and the highest power density. Additionally, the adaptive switching intervals and threshold body braking control schemes may change depending on the operating voltage required by the transient load, allowing for quicker dissipation of overshoot voltage when the transient load is more sensitive to overshoot voltages, such as when the transient load is operating at a low reference voltage ID ("VID"). Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Hereinafter, embodiments will be described with reference to the drawings. Each drawing is a schematic view for describing an embodiment of the present disclosure and promoting the understanding thereof. The drawings should not be seen as limiting the scope of the disclosure. In each drawing, although there are parts differing in shape, dimension, ratio, and so on from those of an actual apparatus, these parts may be suitably changed in design taking the following descriptions and well-known techniques into account.

Figure 1:
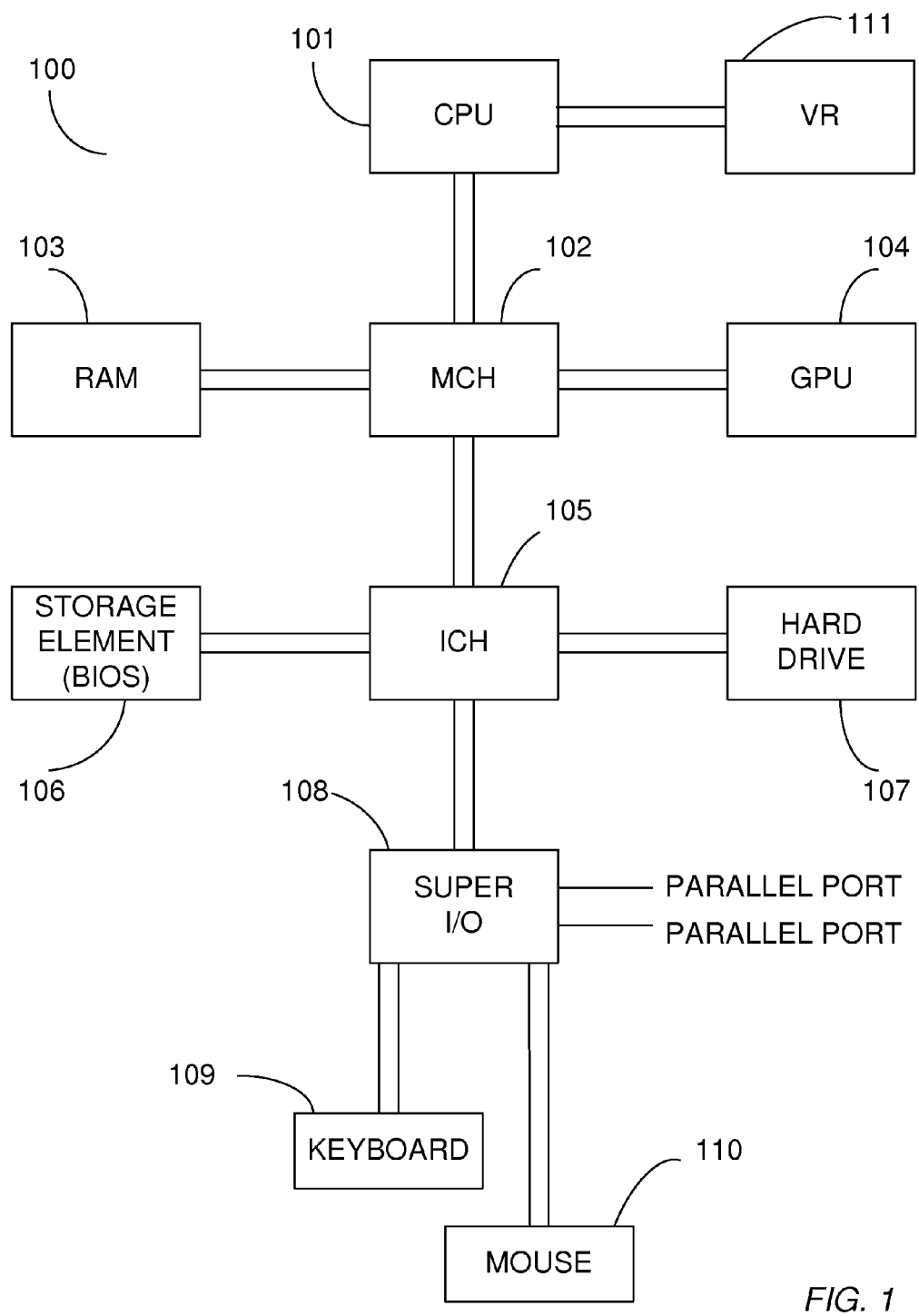
FIG. 1 is an example information handling system.

Shown in FIG. 1 is a block diagram of a typical information handling system 100. A processor or CPU 101 of the typical information handling system 100 is communicatively coupled to a memory controller hub or north bridge 102. Memory controller hub 102 may include a memory controller for directing information to or from various system memory components within the information handling system, such as RAM 103, storage element 106, and hard drive 107. The memory controller hub may be coupled to RAM 103 and a graphics processing unit 104. Memory controller hub 102 may also be coupled to an I/O controller hub or south bridge 105. I/O hub 105 is coupled to storage elements of the computer system, including a storage element 106, which may comprise a flash ROM that includes the BIOS of the computer system. I/O hub 105 is also coupled to the hard drive 107 of the computer system. I/O hub 105 may also be coupled to a Super I/O chip 108, which is itself coupled to several of the I/O ports of the computer system, including keyboard 109, mouse 110, and one or more parallel ports. The above description of an information handling system should not be seen to limit the applicability of the system and method described below, but is merely offered as an example computing system.

The information handling system 100 may further include many point-of-load ("POL") VRs, such as VR 111 coupled to the CPU 101. The VR 111 may be part of a VR for the entire information handling system 100, or it may be a VR devoted to the CPU 101. In some embodiments, the VR 111 may be a synchronous, buck VR. The VR 111 may receive a control signal from the CPU 101 and output power to the CPU 101. The control signal may identify an operating voltage of the CPU 101, and the VR 111 may output power to the CPU 101 at the operating voltage. In some embodiments, the control signal may comprise a voltage identification ("VID") signal. The VID signal may identify a discrete operating voltage of the CPU 101 out of a range of operating voltages under which the CPU 101 may operate.

Figure 2:
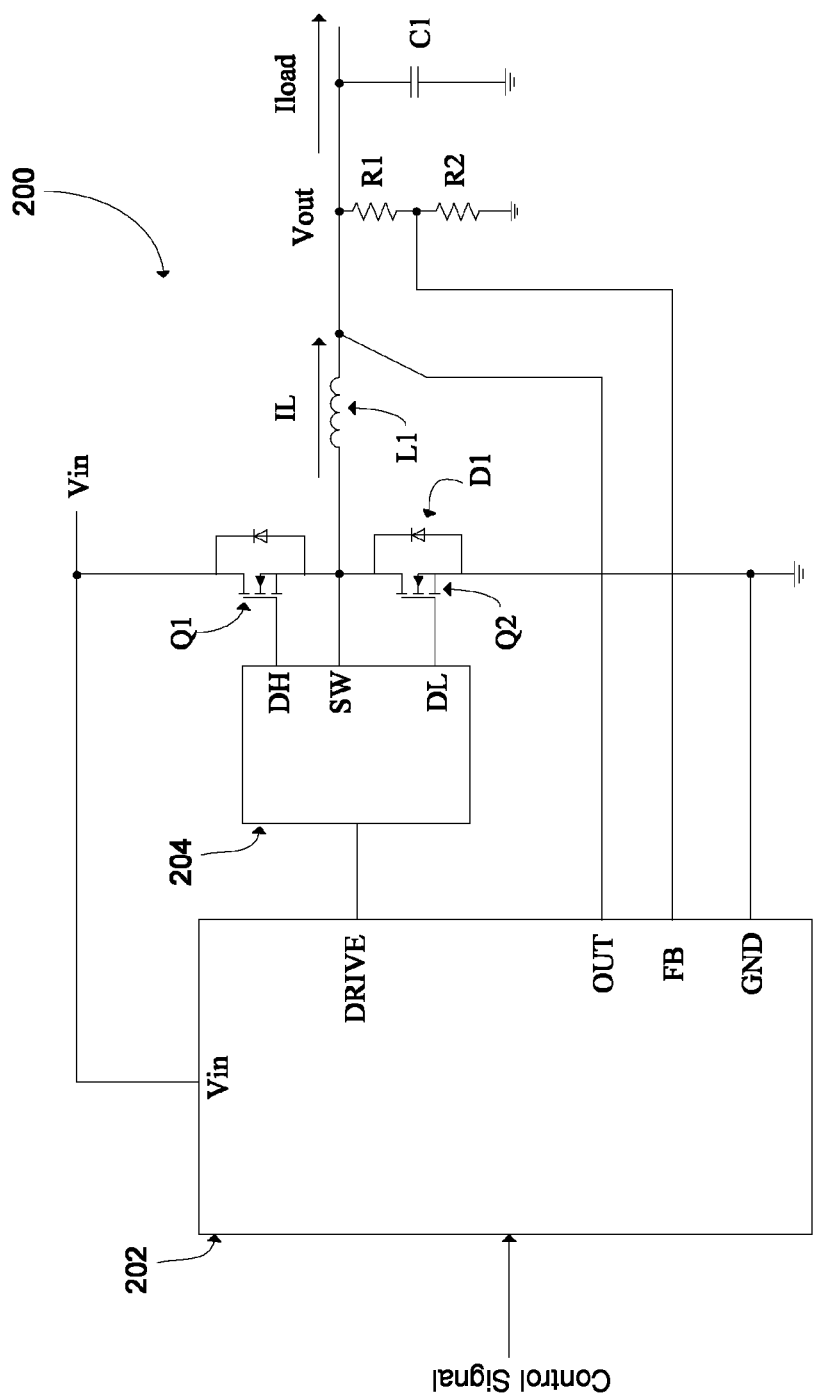
FIG. 2 is an example voltage regulator.

Shown in FIG. 2 is an example synchronous buck VR in the form of a single-phase switching VR 200. The example VR should not be seen as limiting, as other types of VRs are possible, including multi-phase VRs. The VR 200 may include power transistors, specifically power MOSFETs Q1 and Q2, and control circuitry comprised of regulator controller 202 and driver 204. In other embodiment, power transistors may include enhanced MOSFETs or other types of power devices well known in the art, such as bipolar junction transistors. The regulator controller 202 may receive as an input a control signal from the information handling system or from a transient load, such as CPU 101 described above. In response to the control signal, the control circuitry may regulate the output power of VR 200, such that it provides the required power to the transient load at a voltage identified by the control signal. The regulator controller 202 may further receive as inputs an input voltage Vin, an output voltage Vout, and a feedback signal, created by the voltage divider circuit comprising resistors R1 and R2.

The regulator controller 202 may output at least one switching signal to a driver 204, which is connected to the gates of power MOSFETs Q1 and Q2. The driver 204 may turn on and turn off the power MOSFETs Q1 and Q2 in response to the switching signal from the regulator controller 202. Power MOSFETs Q1 and Q2 may operate in a complementary mode, with one of the power MOSFETs Q1 and Q2 turned on and one turned off during stead-state operating conditions. Power MOSFETs Q1 and Q2 may receive an input voltage from an input voltage source Vin and output a voltage Vout required by the transient load. Q1 may be referred to as a control power MOSFET or a high-side ("HS") power MOSFET, and Q2 may be referred to as a synchronous power MOSFET or low-side ("LS") power MOSFET.

The driver 204 may switch the power MOSFETs Q1 and Q2 on and off by selectively outputting gate voltages to the respective gates of MOSFETs Q1 and Q2, causing the power MOSFETs Q1 and Q2 to conduct current. In normal operation, the regulator controller 202 may cause the driver 204 to turn of/turn off the MOSFETs and output power according to a duty cycle, defined as the percentage of the time during a switching cycle which the HS power MOSFETs Q1 is active. The output voltage is typically higher when the duty cycle is higher and lower when the duty cycle is lower. When the HS MOSFET Q1 is on and the LS MOSFET Q2 is off, the input power will charge the inductor L1 and supply a current ILoad to the load. Conversely, when the LS power MOSFET Q2 is on and the HS power MOSFET Q2 is off, the inductor current IL will be discharged by a freewheeling loop consisting of inductor L1, output capacitor C1, and LS power MOSFET Q2.

In existing VRs, when a transient load is released, the duty cycle will drop to 0, turning the HS power MOSFET off and the LS power MOSFET on for the entire duty cycle. At the moment of the load step down, the inductor current IL will be higher than the output load current ILoad, with the current difference flowing into the output capacitor C1 and creating an output voltage overshoot. The overshoot voltage will persist until the inductor current IL drops to the level ILoad. The overshoot voltage is problematic, however, as it can damage sensitive components in the transient load. Existing methods for dealing with the overshoot voltage include increasing the capacitance of the output capacitor C1 to buffer the excess current, or "body braking" by turning off the LS power MOS- FET and using a body diode D1 of the LS power MOSFET, or a parallel schottky diode, to dissipate the excess current. Both options are problematic as large capacitors increase the cost of the VR and "body braking" generates additional power loss and heat.

When a transient load such as a CPU operates in a large voltage range, the worst case overshoot usually occurs at the lowest VID. Conventional body braking methods include turning off the LS FET for either a whole cycle or a period of time targeting the lowest VID only. Unfortunately, this braking method is typically too aggressive for higher VID levels. As a result, power will be unnecessarily dissipated in body diode, which may also cause a thermal issue.

The present disclosure is particularly advantageous because it provides adaptability in body braking control. A body braking control scheme according to aspects of the present disclosure may be adapted to different VID signals as well as different circuitry in a VR. In particular, the body braking time of a particular VR circuitry may be based on the following formula:

$$Toff \sim [2*C*VID*dV-(Irms.*Irms.*Rds\_on)*T\_LS\text{-}on-Pcir*Ttran]/(Vd\_on*Iavg)$$

where Toff represents the total body braking time needed to dissipate overshoot voltage; dV comprises the overshoot voltage; Irms and Iavg represent rms current and average current, respectively, flowing through the LS power MOSFET; Rds_on is on resistance of the LS power MOSFET; C represents to output capacitance of the VR; T_LS-on represents duration of LS MOSFET turn on; Pcir represents other circuitry loss such as inductor DC resistance; Vd_on comprises the forward voltage of body diode; and Ttran is the transient duration. Based on the above formula, body braking time duration may be adaptively programmed with known parameters for a given design. Two example adaptive control schemes are described below, but should not be seen as limiting.

Figure 3:
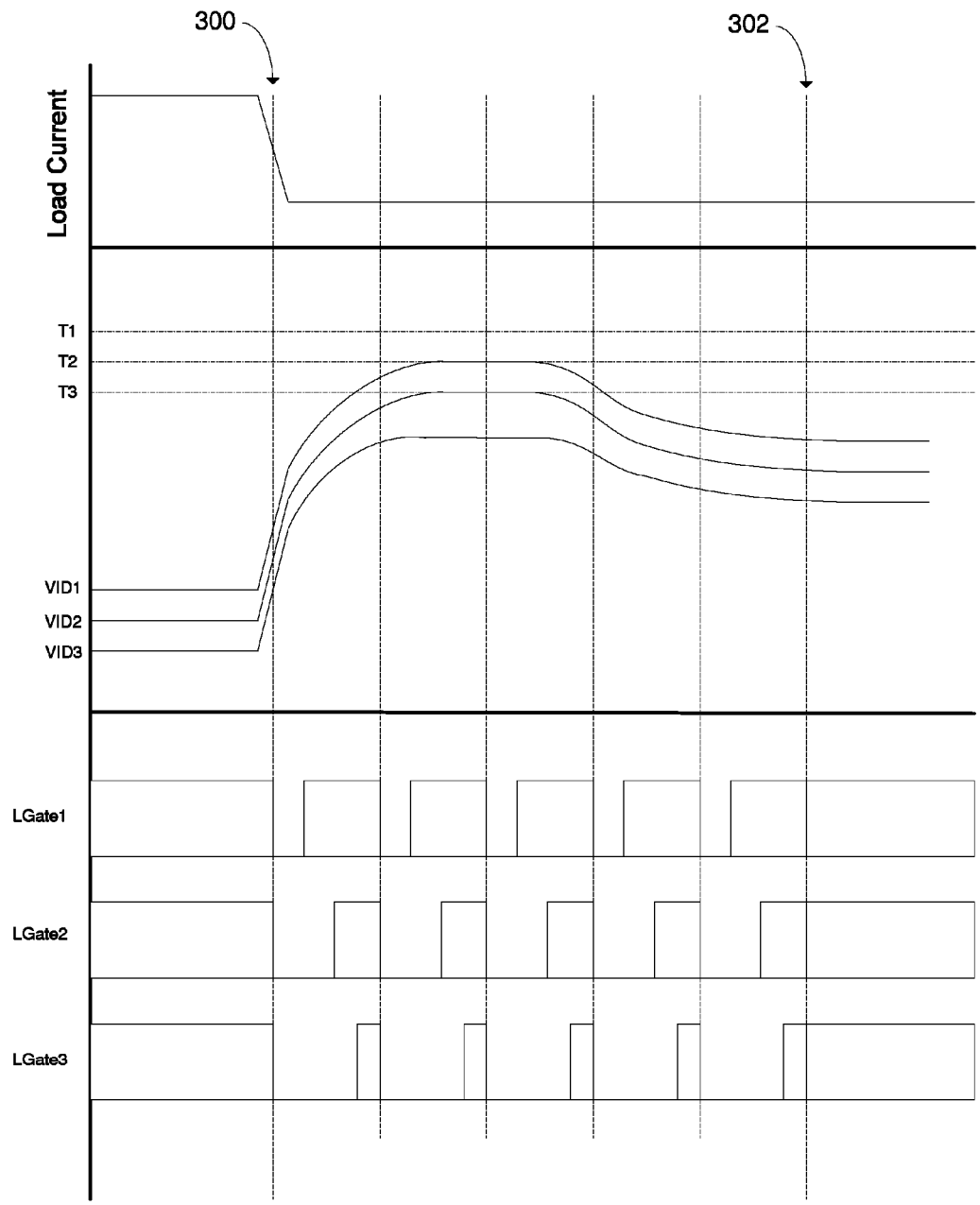
FIG. 3 illustrates an example adaptive body braking technique according to aspects of the present disclosure.
Figure 4:
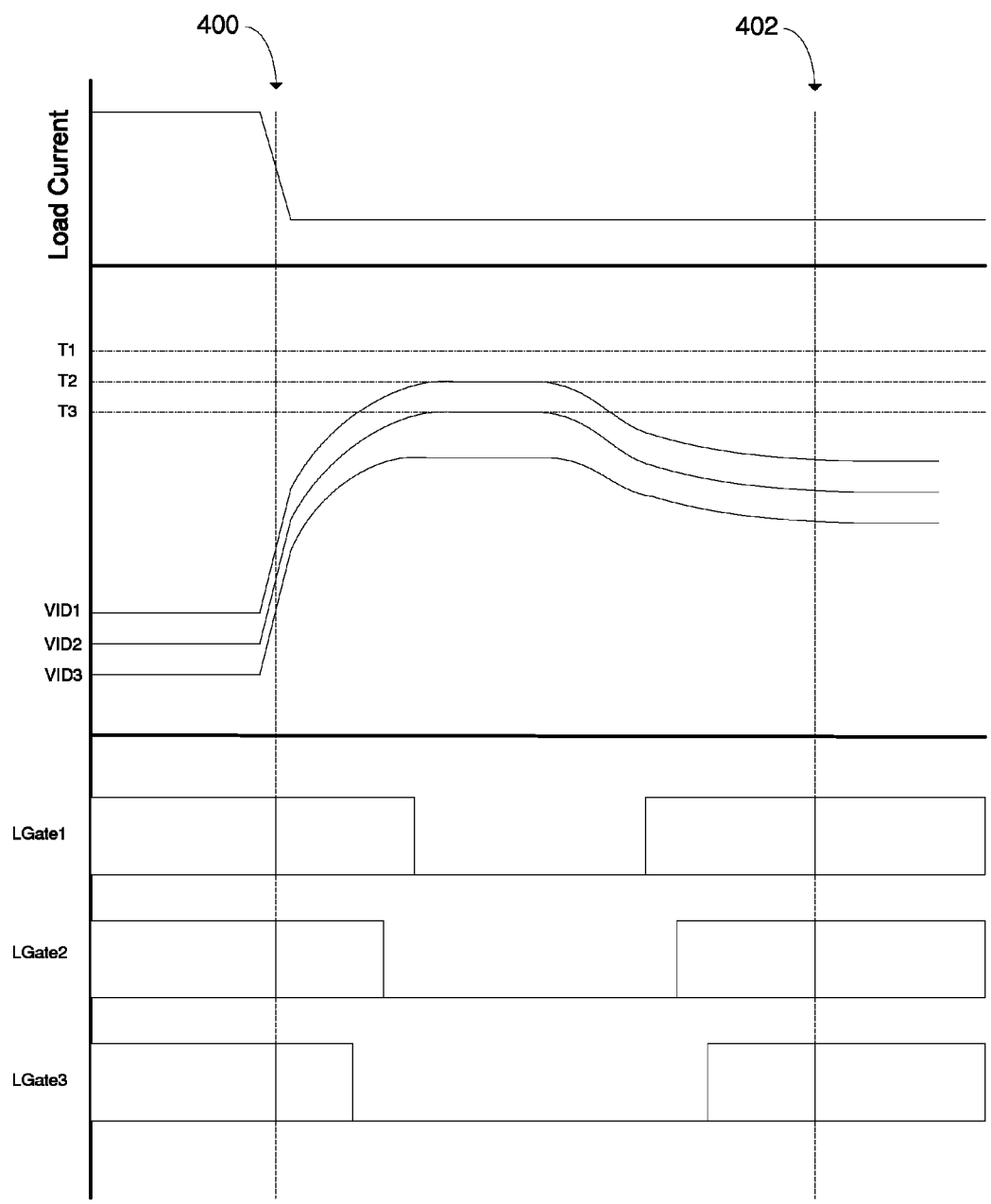
FIG. 4 illustrates an example adaptive body braking technique according to aspects of the present disclosure.

FIGS. 3 and 4 illustrate adaptive "body braking" processes, according to aspects of the present disclosure, which allow for a design tradeoff between the output capacitance and thermal generation in a VR for different operating voltages. The processes illustrated in FIGS. 3 and 4 may be implemented in VRs similar to VR 200 in FIG. 2. FIGS. 3 and 4 illustrate a load power level from a transient load (top section), such as a processor; the output voltages of the VR (middle section) according to three different VID levels, VID1, VID2, and VID3; the transient overshoot limits of a transient load (middle section), T1, T2, and T3, corresponding to three voltage settings VID1, VID2, and VID3, respectively; and LS MOSFET gate control signals (bottom section), LGate1, LGate2, and LGate3, applied to the gate of a LS power MOSFET, such as Q2 in FIG. 2, corresponding to voltage settings VID1, VID2, and VID 3, respectively. Gate control signals may be generated by control circuitry via a drive coupled to the LS and HS MOSFETs.

The left side of the chart in FIG. 3 illustrates a steady-state operating condition of a transient load and VR, with the load current at a high level. During the steady-state conditions, a LS power MOSFET may be turned on and turned off according to a duty cycle, as described above. As also described above, when the transient load decreases its power requirements, but maintains its operating voltage, a VR supplying power to the transient load will generate excess current and thus an overshoot voltage. In FIG. 3, the transient load drops its power requirement at point 300, which is followed by a corresponding overshoot voltage, as is seen in the middle section.

According to aspects of the present invention, a controller of the VR, such as controller 202 in FIG. 2, may respond to the drop in power required by the transient load by entering an overshoot control mode. The controller may either sense the overshoot voltage through a feedback mechanism, as described in FIG. 2, and enter the overshoot control mode, or the controller may receive a signal from the transient load causing the controller to enter into an overshoot control mode. The overshoot control mode may last from point 300 to at point 302, when the VR and the transient load return to another steady state operating condition. The controller may determine when a steady-state condition has been reached according to present criteria related to the VID, load line, and load current.

In certain embodiments, the control circuitry of a VR operating in an overshoot control mode may turn off a HS power MOSFET, turn on a LS power MOSFET for at least one first duration, and turn off the low-side power transistor for at least one second duration. In the embodiment illustrated in FIG. 3, the at least one first duration and the at least one second duration may correspond to a pre-determined switching pattern stored within a controller of the VR. The controller may include multiple pre-determined switching pattern, each corresponding to a different operating voltage, load line, and load current. In certain embodiments, the pre-determined switching pattern may be adaptively programmed to account for known parameters or a given VR design. In other words, as will be described below, the pre-determined switching pattern may vary between different VRs for the same operating voltage level depending on, for example, the output capacitance of the VR, the thermal tolerance of the VR, the projected cost of the VR, and the power density of the VR.

As can be seen in FIG. 3, the on/off durations of the LS power MOSFET may correspond to the operating voltage of the transient load. For example, the gate control signal LGate1 may be pre-programmed into the controller to generate the on/off durations that correspond to the operating voltage indicated by voltage setting VID1. Referring to gate control signal LGate1, the gate voltage of a LS power MOSFET may be driven high for at least one first interval, turning on the LS power MOSFET, and causing excess current to charge an output capacitor of the VR. Conversely, the gate voltage of a LS power MOSFET may be driven low for at least one a second duration, turning off the LS power MOSFET, and causing the excess power to be more quickly dissipated in a body diode of the LS power MOSFET because the body diode has a higher cross voltage than the MOSFET channel. The at least one first duration and the at least one second duration may be repeated either a fixed number of times or until a feedback signal indicates that the VR and transient load have reached a steady state operating condition. Like VID1 and LGate1, the pre-defined switching patterns generated by gate control signals LGate2 and LGate3 may correspond to the operating voltages indicated by VID2 and VID3, respectively.

As can further be seen in FIG. 3, the body braking time of the LS power MOSFET, i.e. the time during which the LS power MOSFET is turned off, may increase as the operating voltage of the transient load decreases. Typically, transient loads are more sensitive to overshoot voltages when the operating voltage is lower, as can be seen by transient overshoot limits T1, T2, and T3. By increasing the body braking time, the overshoot may settle more quickly because more of the excess power is dissipated in a body diode of the LS power MOSFET. Likewise, reducing the body braking time when the transient load is less sensitive to overshoot voltage is advantageous because it avoids the unnecessary generation of heat and power loss in the body diodes of the power MOS- FETs when it would be otherwise sufficient for a freewheeling circuit loop to dissipate the excess power. Moreover, the overshoot control method described above is also advantageous because the heat caused by body braking may be gradually spread out to avoid instantaneous thermal impedance concerns.

In the embodiment illustrated in FIG. 4, the at least one first duration and the at least one second duration may be correspond to the time during which the overshoot exceeds a pre-determined threshold voltage stored in a controller of a VR. Like the pre-determined switching patterns, each of the pre-determined threshold voltages may correspond to a different operating voltage of the transient load. In certain embodiment, such as in FIG. 4, a controller of a VR may be pre-programmed with threshold levels corresponding to each operating voltage of a transient load. For example, each operating voltage indicated by a control signal from a transient load, such as a VID signal from a processor, may have a corresponding threshold. The predetermined threshold values are distinct from the transient overshoot limits T1, T2, and T3 corresponding to voltage settings VID1, VID2, and VID3, respectively, but may be defined in terms of the transient overshoot limits, such as 75% of the transient overshoot limit.

A control circuitry of a VR may turn off the LS power MOSFET and initiate body braking for a duration corresponding to the amount of time in which the overshoot voltage exceeds a predetermined threshold. The control circuitry may turn the LS power MOSFET on for a duration once the overshoot voltage drops below the predetermined threshold. The predetermined threshold may be based, at least in part, on the current VID signal and other VR parameters. For example, a controller of a VR may receive a voltage setting, VID1, from a transient load. Upon entering an overshoot control mode at point 400, the controller may compare the output voltage to a threshold value corresponding to the voltage setting VID1. The resulting gate voltage sequence LGate1 is high initially as the overshoot voltage increases, causing the low-side MOSFET to be turn on and an output capacitor of the VR to be charged by the excess current. As the overshoot voltage climbs, and the output voltage exceeds the threshold levels, the gate voltage may be changed to a low level, turning off the low-side power MOSFET and causing a body diode of the low-side power MOSFET to dissipate the excess current. The LS power MOSFET may then be turned on again when the output voltage drops below the predetermined threshold. The overshoot control mode may last to point 402, when the VR and the transient load return to another steady state operating condition. The controller may determine when a steady state condition has been reached as per preset criteria. A similar process may occur regarding gate control signal LGate2 and LGate3 and control signals VID2 and VID3, respectively.

As can further be seen in FIG. 4, the body braking time of the low-side power MOSFET, i.e. the time during which the low-side power MOSFET is turned off, may increase as the operating voltage of the transient load decreases. Typically, transient loads are more sensitive to overshoot voltages when the operating voltage is lower, as can be seen by transient overshoot limits T1, T2, and T3. By increasing the body braking time, the output voltage of the VR may settle more quickly than it would if output capacitance was used alone. Likewise, reducing the body braking time when the transient load is less sensitive to overshoot voltage is advantageous because it avoids the unnecessary generation of heat and power loss in the body diodes of the power MOSFET when it would be otherwise sufficient to dissipate the excess power in the freewheeling circuit loop of a VR. Moreover, the overshoot control method described with regard to FIG. 4 is advantageous because it employs a more aggressive body braking scheme, suppressing the overshoot in a shorter period of time. Also, this provides an opportunity to use less output capacitance which saves cost and reduces the size of the VR.

Figure 5:
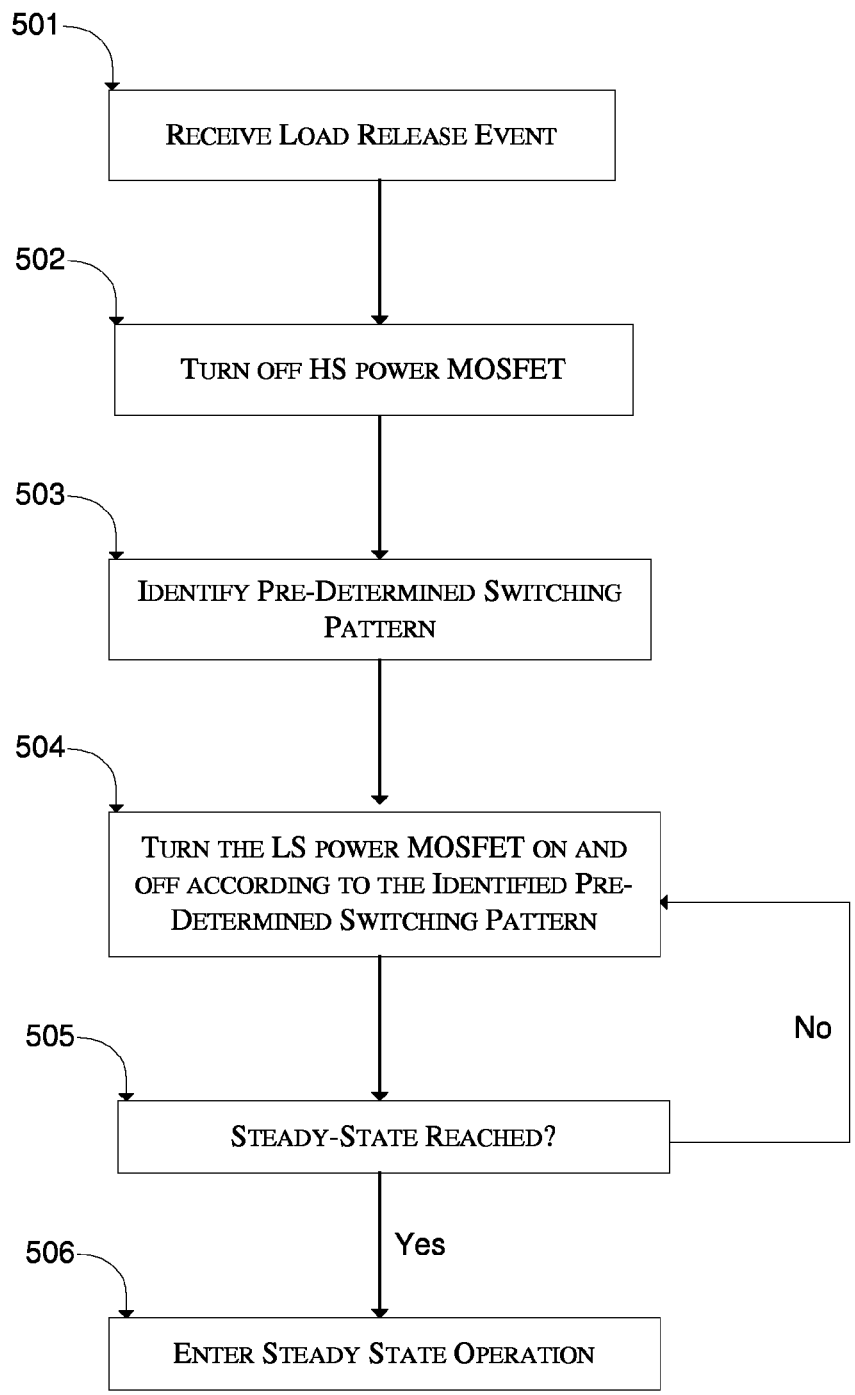
FIG. 5 illustrates an example method incorporating aspects of the present disclosure.

FIG. 5 illustrates an example process incorporating aspects of the present disclosure. At step 501 a load release event occurs, with the transient load decreasing its power requirement. At step 502, a HS power MOSFET of the VR may be turned off. At step 503, a pre-determined switching pattern may be determined. The pre-determined switching pattern may be pre-programmed into a controller of a VR, and may be based, at least in part, on a VID signal received at the controller. Identifying the pre-determined switching pattern may include selecting a pre-programmed switching pattern corresponding to the VID signal being received at the controller. The identification step as well as the pre-programmed switching patterns may also account for a load line and load current of the VR.

At step 504, the LS power MOSFET may be turned on and off for durations that correspond to the pre-determined switching pattern. If a steady-state is not reached, at step 505, the process may continue turning the LS power MOSFET on and off. Once a steady-state operating condition is reached, the VR may switch to steady state operation. In an alternative embodiment, the VR may identify a pre-determined switching pattern every time system conditions change, such as when the load current level drops to a certain level.

Figure 6:
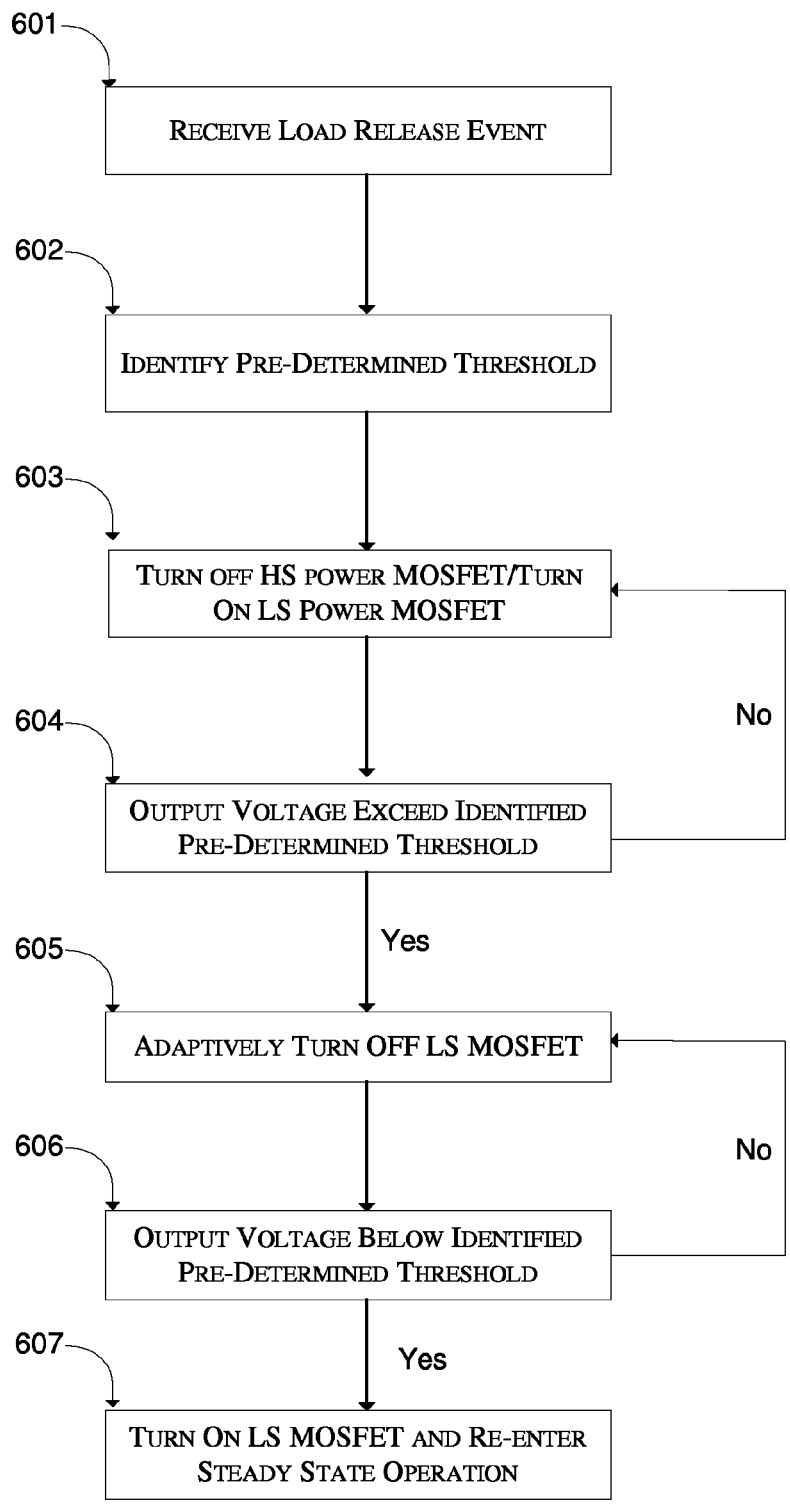
FIG. 6 illustrates an example method incorporating aspects of the present disclosure.

FIG. 6 illustrates an additional process incorporating aspects of the present invention. At step 601 a load release event occurs, with the transient load decreasing its power requirement. At step 602, a pre-determined threshold may be applied. The pre-determined threshold may be pre-programmed into a controller of a VR, and may be based, at least in part, on a VID signal received at the controller. Identifying the pre-determined threshold may include adaptively selecting a pre-programmed threshold corresponding to the VID signal being received at the controller as well as a load line and load current of the VR.

At step 603, a HS power MOSFET may be turned off and a LS power MOSFET may be turned on. If the pre-determined threshold is not reached, at step 604, the HS power MOSFET may stay off and a LS power MOSFET may stay on. Once a pre-determined threshold is reached, the LS power MOSFET may be adaptively turned off, instituting body braking at step 605. The LS power MOSFET may remain off until the output voltage drops below the pre-determined threshold at step 606. Once the output voltage drops below the pre-determined threshold, the LS power MOSFET may be turned on at step 607.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are defined herein to mean one or more than one of the element that it introduces.

Although the present disclosure has been described in detail, it should be understood that various changes, substitutions, and alterations can be made hereto without departing from the spirit and the scope of the invention as defined by the appended claims.

What is claimed is:

1. A voltage regulator, comprising:
a high-side power transistor;
a low-side power transistor, wherein the high-side power transistor and the low-side power transistor are operable to output power to a transient load, and wherein the high-side power transistor and the low-side power transistor comprise enhanced metal-oxide-semiconductor field-effect transistors ("MOSFETs");
control circuitry coupled to the high-side power transistor, the low-side power transistor, and the transient load, wherein the control circuitry is operable to receive a control signal from the transient load, wherein the control signal corresponds to an operating voltage of the transient load, wherein the control signal comprises a voltage identification ("VID") signal generated at the processor;
wherein the transient load comprises a processor in an information handling system;
wherein the control circuitry comprises a regulator controller and a driver;
wherein in response to a decrease in a power level required by the transient load, the control circuitry is operable to turn off the high-side power transistor, turn on the low-side power transistor for at least one first duration, and turn off the low-side power transistor for at least one second duration, wherein the at least one first duration and the at least one second duration are based, at least in part, on the operating voltage; and
wherein the at least one first duration and the at least one second duration correspond to a predetermined switching pattern, wherein the predetermined switching pattern corresponds to an operating voltage identified by the voltage identification signal.

2. The voltage regulator of claim 1, wherein the at least one first duration and the at least one second duration correspond to a predetermined threshold, wherein the predetermined threshold corresponds to an operating voltage identified by the voltage identification signal.

3. The voltage regulator of claim 2, wherein the predetermined switching pattern is adaptively determined at the regulator controller using at least one of a VID signal, a load line current, and a transient step value.

4. The voltage regulator of claim 3, wherein the predetermined threshold pattern is adaptively determined at the regulator controller using at least one of a VID signal, a load line current, and a transient step value.

5. A method for providing power in an information handling system, comprising:
receiving at a control circuitry in a voltage regulator a control signal from a transient load, wherein the control signal corresponds to an operating voltage of the transient load, wherein the control signal comprises a voltage identification ("VID") signal generated at the processor, and wherein the control circuitry comprises a regulator controller and a driver;
outputting at the operating voltage a power level required by the transient load;
in response to a decrease in a power level required by the transient load:
turning off a high-side power transistor of the voltage regulator,
turning on a low-side power transistor of the voltage regulator for at least one first duration, and
turning off the low-side power transistor for at least one second duration,
wherein the high-side power transistor and the low-side power transistor comprise enhanced metal-oxide-semiconductor field-effect transistors ("MOSFETs"), and wherein the transient load comprises a processor in an information handling system;
wherein the at least one first duration and the at least one second duration are based, at least in part, on the operating voltage of the transient load; and
wherein the at least one first duration and the at least one second duration correspond to a predetermined switching pattern, wherein the predetermined switching pattern corresponds to an operating voltage identified by the VID signal.

6. The method of claim 5, wherein the at least one first duration and the at least one second duration correspond to a predetermined threshold, wherein the predetermined threshold corresponds to the operating voltage identified by the VID signal.

7. The method of claim 6, wherein the predetermined switching pattern is adaptively determined at the regulator controller using at least one of a VID signal, a load line current, and a transient step value.

8. The method of claim 7, wherein the predetermined threshold pattern is adaptively determined at the regulator controller using at least one of a VID signal, a load line current, and a transient step value.

9. An information handling system, comprising:
a processor;
a voltage regulator coupled to the processor, comprising:
a high-side metal-oxide-semiconductor field-effect transistors ("MOSFET");
a low-side MOSFET, wherein the high-side MOSFET and the low-side MOSFET are operable to output power to the processor; and
control circuitry coupled to the high-side MOSFET, the low-side MOSFET, and the processor, wherein the control circuitry is operable to receive a voltage identification ("VID") signal from the processor, and wherein the VID signal identifies an operating voltage of the processor;
wherein in response to a decrease in the power required by the processor, the control circuitry is operable to turn off the high-side MOSFET, turn on the low-side MOSFET for at least one first duration, and turn off the low-side MOSFET for at least one second duration, wherein the at least one first duration and the at least one second duration are based, at least in part, on the VID signal.

10. The information handling system of claim 9, wherein the at least one first duration and the at least one second duration correspond to a predetermined switching interval, wherein the predetermined switching interval corresponds to the operating voltage identified by the VID signal.

11. The information handling system of claim 9, wherein the at least one first duration and the at least one second duration correspond to a predetermined threshold, wherein the predetermined threshold corresponds to the operating voltage identified by the VID signal.

* * * * *